No. 634,060. Patented Oct. 3, 1899.
E. A. LELAND.
FILTER.
(Application filed June 5, 1899.)
(No Model.)
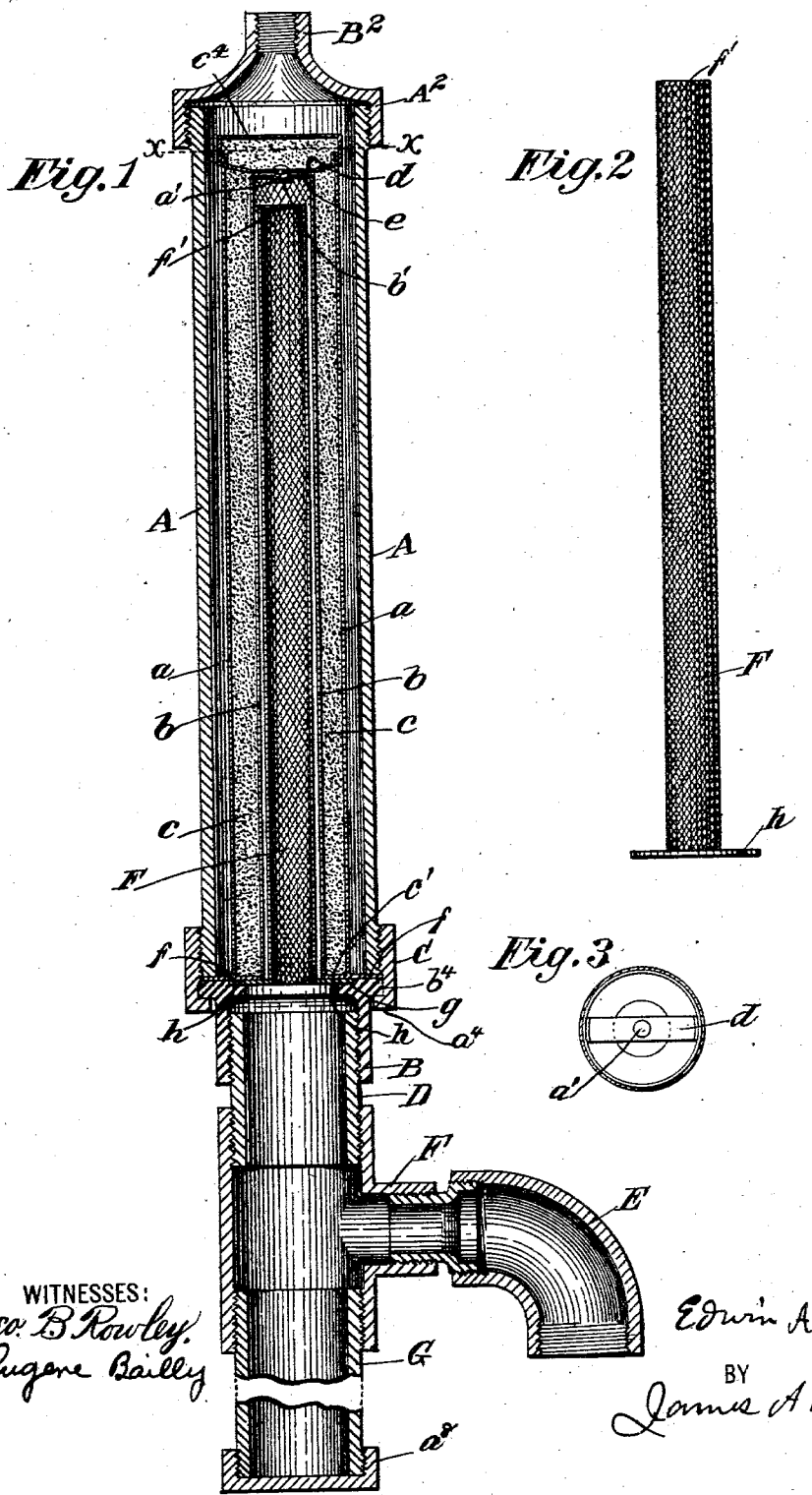
WITNESSES:
Geo. B. Rowley.
Eugene Bailly.
INVENTOR
Edwin A. Leland
BY
James A. Whitney
ATTORNEY
THE NORRIS PETERS CO., PHOTO-LITHO., WASHINGTON, D. C.

UNITED STATES PATENT OFFICE.

EDWIN A. LELAND, OF GREAT BARRINGTON, MASSACHUSETTS.

FILTER.

SPECIFICATION forming part of Letters Patent No. 634,060, dated October 3, 1899.

Application filed June 5, 1899. Serial No. 719,389. (No model.)

*To all whom it may concern:*

Be it known that I, EDWIN A. LELAND, a citizen of the United States, residing at Great Barrington, in the county of Berkshire and State of Massachusetts, have invented certain new and useful Improvements in Filters; and I do hereby declare that the following is a full, clear, and exact description of the same, reference being had to the accompanying drawings, making a part of this specification, in which—

Figure 1 is a vertical sectional view of a filter made according to my invention. Fig. 2 is a detail view of one part thereof. Fig. 3 is a sectional view of certain parts of the apparatus, taken in the line $x\ x$ of Fig. 1.

This invention is designed to provide an economical, effective, and easily-manipulated means for cleaning filters when clogged with mechanical impurities, and to that end it comprises certain new and useful combinations of parts hereinafter fully set forth and explained.

A is the cylindrical shell or case of a filter. This shell couples upon an internally-screw-threaded pipe-section B by means of a coupling-nut C, which screws upon the lower end of the shell and has an internal flange $a^4$, which grips below an external flanges $b^4$ at the upper end of said pipe-section, and thereby connects the latter to the shell and grips the flanges $h$ and $f$, hereinafter described, against the end of the shell, for purposes hereinafter explained. Onto the pipe-section B is screwed the upper end of a pipe section D, the threaded lower end of which screws into the upper end of a T-section F, to which is appended an inlet-pipe E, through and from which the liquid to be filtered passes to the apparatus. The lower end of the T-section F screws upon the upper end of a tube G, which is closed at its bottom, as shown at $n^8$, and which forms a receptacle for silt and other mechanical impurities which by reason of their gravity fall from the filter. The arrangement of the several threaded or screw sections just described enables the filter and its adjuncts to be readily detached from the supply-pipes to permit the removal of mechanical impurities from the apparatus, as herein presently to be described. The upper end of the shell A is screwed into the flaring adjunct coupling $A^2$ of an outlet or distributing pipe $B^2$.

Within the shell A is a filtering apparatus composed of two concentric foraminated cylinders $a$ and $b$, which may be most conveniently made of wire-cloth of a mesh and character adapted to retain a granular or other filtering material between the two cylinders. This material (shown at $c$ in Fig. 1) may be of any suitable character; but in practice I have found that a fine quartz-sand is suitable for the purpose. The outer cylinder $a$ is closed at its top by a detachable cap $C^4$. Below this cap and extended across said cylinder is a cross-bar $d$, at the center of which is a downwardly-projecting stud $a'$. The inner cylinder is capped or closed at its upper end and has in its top or cap $e$ a recess $b'$. This recess is so arranged as to receive the stud $a'$ in such a manner that the stud holds the inner cylinder $b$ equidistant from the outer cylinder $a$ around its entire circumference, and thereby insures the requisite uniformity throughout in the thickness of one space between the two cylinders, and consequently of the filtering material. The space between the cap of the inner cylinder and the top of the outer cylinder should be filled with filtering material, as indicated in Fig. 1. The space between the two cylinders is closed at bottom, as shown at $c'$, and flange $f$, extended outward from the outer cylinder and clamped between the lower end of the shell A and the upper face of the section B, firmly holds the lower parts of the filtering devices and of the strainer, herein yet to be described, in position. The upper face of the section B is internally channeled or rabbeted, as shown at $g$ in Fig. 1.

Shown in longitudinal section in Fig. 1 and separately in side view in Fig. 2 is a cylindrical foraminated strainer F, made, preferably, of wire-cloth, closed at top, as shown at $f'$, and having at its lower end an outwardly-extended flange $h$. The size and proportions of this strainer are such as to enable it to be passed within the inner cylinder $b$, with its flange $h$ placed in the rabbet $g$ of the section B to more firmly secure the retention of the strainer in place. The strainer may fit more or less snugly within the cylinder $b$ or may be in any desired proximity to the inner surface thereof. The flange *h* of the strainer serves the further important purpose of preventing communication between the filter and its inlet except through the meshes or foraminations of the strainer, as will be understood in referring to Fig. 1. The strainer is removable, inasmuch as it may be easily taken out of the cylinder *b* by first uncoupling the shell A from the section B. Of course the strainer may be placed or replaced in the cylinder *b* by a similar disconnection of the shell from the section B.

The water (or other liquid) to be filtered enters the apparatus from the inlet E and passes through the strainer F, the latter separating all mechanical impurities which are too large to pass through its meshes or perforations, the grosser particles being permitted to fall into the receptacle G, while others may adhere to the inner surface of the strainer. By this means the filtering devices—*i. e.*, the foraminated cylinders *a* and *b* and the filtering material *c*—are kept clear of impurities and particles of matter which, as found by experience, would otherwise inevitably clog them and impair their action. When an impaired action due to accumulation of deposits upon the strainer is observed, the shell A is separated from the adjacent parts, as hereinbefore described. This permits the temporary removal and cleaning of the strainer F, and also affords access to the receptacle G to permit the accumulated contents of the latter to be taken away. By this means the filtering devices are made capable of indefinite use with no appreciable diminution of their filtering capacity.

What I claim as my invention is—

1. The combination with two foraminated concentric cylinders, a granular filtering material in a space between said cylinders and a shell inclosing the cylinders with a space between itself and the outer cylinder, of a cylindrical strainer fitted within the inner cylinder, closed at one of its ends and having at its opposite end an outwardly-extended flange, and a pipe-section arranged to grip the flange between the end of the pipe-section and the adjacent end of the shell, substantially as herein set forth.

2. A filter composed of an outer foraminated cylinder, *a*, provided at its closed top with a cross-bar having an inwardly-projecting stud, *a'*, an inner foraminated cylinder, *b*, having at its top a recess to receive the stud, *a'*, a filtering material between the two cylinders, and a shell, A, having a space between itself and the outer cylinder, *a*, of a removable strainer, F, having a flange, *h*, and located within the inner cylinder of the filter with its flange extended under the lower end thereof, and means for gripping said flange against said lower end to retain the strainer in place, substantially as herein set forth.

3. The combination with a filter composed of an outer foraminated cylinder, *a*, provided at its top with a cross-bar having an inwardly-projecting stud, *a'*, and constructed at its bottom with an outwardly-extended flange, an inner foraminated cylinder, *b*, having at its top a recess to receive the stud, *a'*, a filtering material between the two cylinders, and a shell, A, having a space between itself and the outer cylinder, of a removable cylindrical strainer F, having a flange, *h*, and located within the inner cylinder of the filter with its flange extended under the lower end thereof, a screw-section, B, arranged below the flanges at the outer cylinder and of the strainer against the lower end of the shell and a coupling-nut for holding the said section to the shell to grip said flanges to retain the filter and the strainer in position, substantially as herein set forth.

EDWIN A. LELAND.

Witnesses:
J. C. FREIN,
JOHN S. STONE.